United States Patent [19]
Williams et al.

[11] Patent Number: 5,938,933
[45] Date of Patent: Aug. 17, 1999

[54] CONDENSATE DRAIN PAN FOR HVAC UNITS

[75] Inventors: Richard Williams, Princeton, Tex.;
Mark A. Clover, Raymore, Miss.;
Russell D. Ostermann, Lawrence, Kans.

[73] Assignee: Butler Manufacturing Company, Inc., Kansas City, Mo.

[21] Appl. No.: 08/919,510

[22] Filed: Aug. 28, 1997

[51] Int. Cl.[6] .................................. C02F 1/28; C02F 9/00
[52] U.S. Cl. ........................... 210/688; 210/284; 210/912
[58] Field of Search ........................ 62/285, 291; 75/726; 210/688, 251, 259, 282, 284, 912; 220/571

[56] References Cited

U.S. PATENT DOCUMENTS

| | | | |
|---|---|---|---|
| 4,450,002 | 5/1984 | Durkee | 75/726 |
| 4,856,672 | 8/1989 | Sullivan | 220/571 |
| 4,941,400 | 7/1990 | Moore | 99/403 |
| 5,071,027 | 12/1991 | Sullivan | 220/571 |
| 5,082,492 | 1/1992 | Gallup et al. | 75/726 |
| 5,117,650 | 6/1992 | Kim | 62/285 |
| 5,174,467 | 12/1992 | Sullivan | 220/571 |
| 5,664,430 | 9/1997 | Karman | 62/291 |
| 5,669,230 | 9/1997 | Bruce et al. | 62/285 |

*Primary Examiner*—Ivars Cintins
*Attorney, Agent, or Firm*—Shoemaker and Mattare, Ltd.

[57] ABSTRACT

A drain pan is provided for removing copper ions from condensate water produced by a heating, ventilation and air conditioning unit. The pan defines a volume having two closed ends and an open top so that water can evaporate from the pan. At least one copper removing agent is placed in the pan, and a baffle is provided between the ends of the pan, for routing water entering the pan at one end through the removing agent en route to an outlet at the other end. The removing agent may include mossy zinc and/or activated charcoal.

4 Claims, 3 Drawing Sheets

CONDENSATE DRAIN PAN FOR HVAC UNITS

BACKGROUND OF THE INVENTION

This invention relates to the art of building construction and more particularly to a condensate drain pan for heating, ventilating and air conditioning (HVAC) units mounted upon the roof.

Butler Manufacturing Company, Kansas City, Mo., manufactures metal roof panels used in building construction. One such panel, sold by Butler under its trademark "MR-24", comprises a 22–24 gauge steel substrate coated with an aluminum-zinc (Al—Zn) alloy. Corrosion of these panels can result when HVAC units drip condensate onto an MR-24 roof for an extended period. We have identified the problem as resulting from copper ions leached by the water from copper tubing in the HVAC units. The copper ions, unless neutralized or removed, react with and corrode the roof panel coating, eventually resulting in rust-through.

While a great deal of attention has been directed over the years to preventing roof corrosion, no inventor, to our knowledge, has specifically tackled or identified the copper ion problem. Rain water is essentially copper-free; the premature corrosion problem arises only with roof-mounted HVAC units.

SUMMARY OF THE INVENTION

Two objects of this invention are to capture HVAC condensate, and to neutralize or remove copper ions in the condensate before it reaches the roof surface.

These and other objects are attained by a condensate drain pan for HVAC units, the drain pan comprising a stainless steel trough or pan running along the drain side of an HVAC unit, and a filter containing copper ion removing agent(s) within the pan, below the level of an overflow outlet. The filtering or removing agent is one or more of the following: charcoal, mossy zinc, and/or the surface of the stainless steel trough itself. The charcoal and/or zinc is preferably contained in a screened encasement to keep the agents from floating and reaching the overflow outlet.

The pan is sufficiently broad and wide that the condensate normally developed by the HVAC unit may evaporate from the pan; however, should the volume of condensate produced exceed its rate of evaporation, the pan is designed to force the condensate to flow through the filter agent before it drains onto the roof.

BRIEF DESCRIPTION OF THE DRAWINGS

In the accompanying drawings.

DESCRIPTION OF THE PREFERRED EMBODIMENTS

Figure 1:
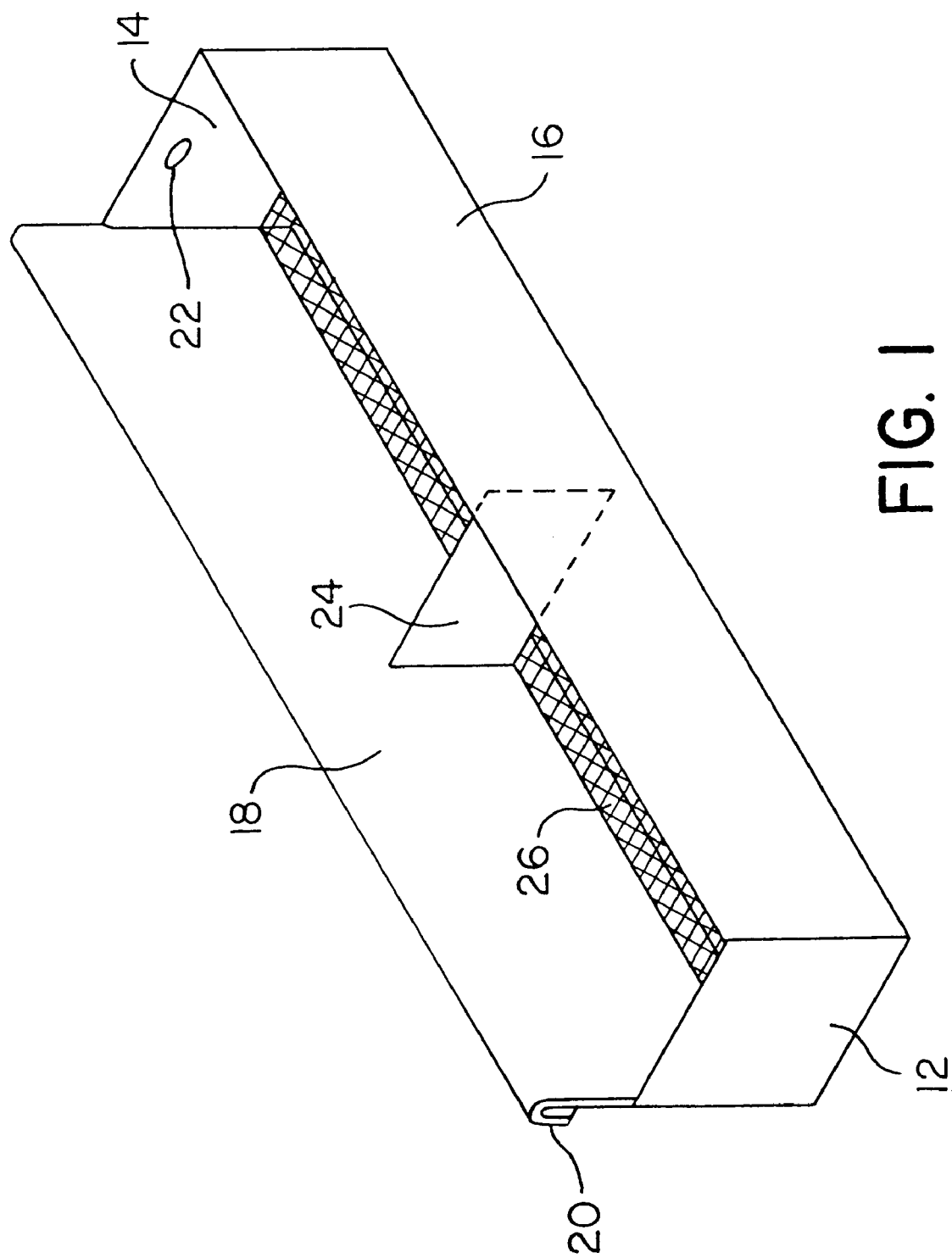
FIG. 1 is an isometric view of a condensate drain pan for HVAC units embodying the invention.
Figure 2:
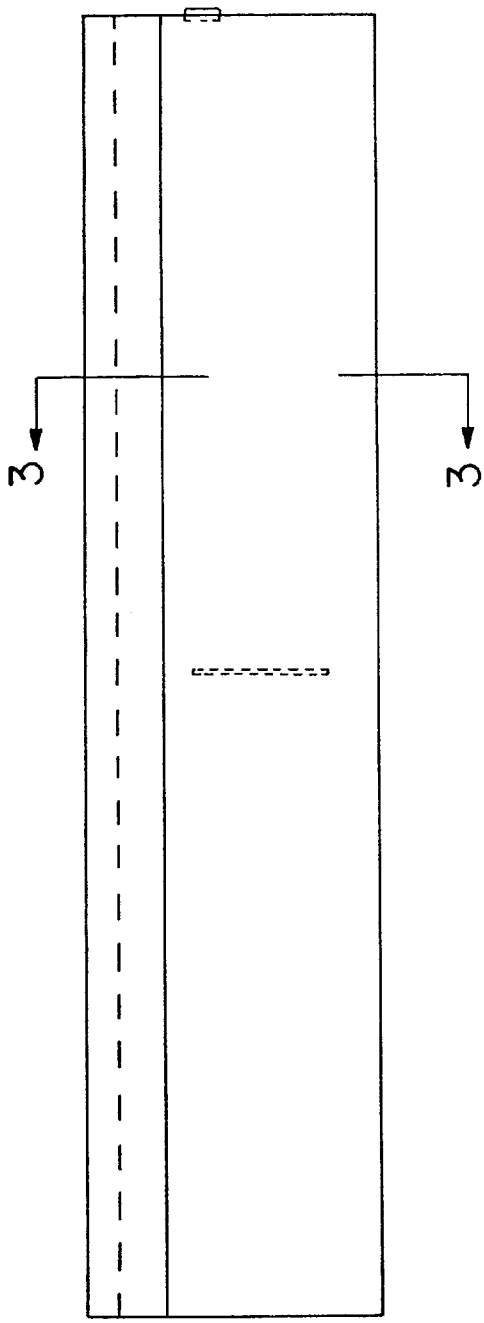
FIG. 2 is a rear elevation thereof.
Figure 3:
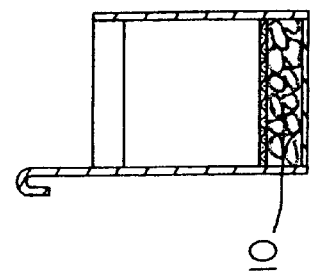
FIG. 3 is a sectional view taken on the vertical plane 3—3 in FIG. 2.

A condensate drain pan embodying the invention is shown in FIG. 1, installed along one bottom side of an HVAC unit atop a roof. If the roof has a slope, the pan should be installed on the downslope side of the unit.

While the exact shape of the pan is not important, the preferred pan is a simple parallelepiped having a planar floor 10, four side panels 12, 14, 16 and 18, and an open top. The rear side panel is taller than the others; its upper edge is turned over rearward, forming a hook 20 for suspending the pan from a piece of "J" trim (FIG. 4) secured to a curb directly under the HVAC unit.

Figure 4:
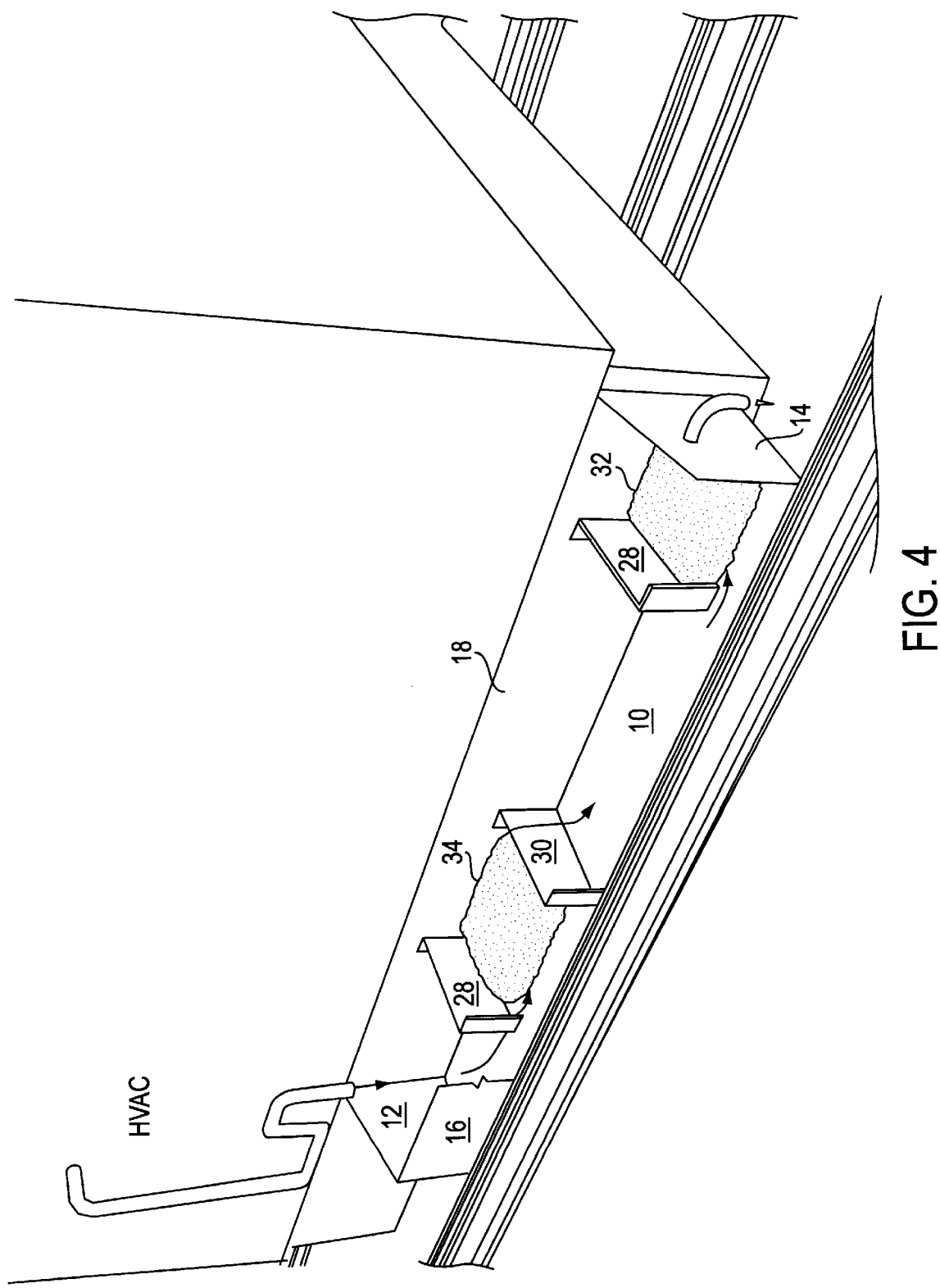
FIG. 4 is a perspective view of a modified form of the invention, partially broken away to show interior detail.

The right and left side panels 12, 14 are identical, except for a drain hole 22 formed near the upper edge of one, at the end of the pan opposite the infeed end. The hole may be fitted with an elbow outlet pipe, as shown in FIG. 4.

A baffle 24 is connected—by fasteners, adhesives, or by welding—between the front and rear panels. Its lower edge is some distance above the floor of the pan, so that water can flow under, but not over, it. The upper edge of the baffle is above the level of the drain hole.

In use, a mass of copper removing agent is placed in the pan so that condensate water flows through it as the water moves from one end of the pan to the other. Two agents found to be effective are zinc and activated charcoal. Zinc, having greater electro negativity that copper, replaces copper ions in the water with zinc ions. We are unsure of why activated charcoal works, but have observed a decrease of copper ion content from 55 ppm down to one or two ppb. The time of exposure, plus the degree of mixing, affects the efficiency of the unit.

Particularly when charcoal is used, it is desirable to insert a horizontal screen or grate 26 into the pan above the charcoal, but below the level of the outlet hole, to prevent agent from reaching the outlet hole and spilling out onto the roof.

A second embodiment of the invention is shown in FIG. 4. Here, the single mass of removing agent is replaced by two distinct filter packs 32,34, each encased in a screen or mesh envelope. While the two packs could be identical, it is preferred that they be distinct. For example, the upstream pack may contain charcoal, and the downstream pack may contain mossy zinc. The two pair of baffles in this embodiment are arranged so as to force condensate to flow through the two packs in series (rather than over them) en route to the drain outlet. Each baffle pair includes an upstream raised baffle 28 which permits only underflow and a downstream lower baffle 30, which acts as a weir, permitting only overflow. The function of the rightmost lower baffle is performed by the end wall 14. A horizontal filter pack 32 or 34 is retained between the raised and lower baffles at an intermediate height, so that water flowing under the first baffle is forced to pass through the filter pack in order to flow over the lower baffle. The filter packs may sit on the bottom of the pan, or they may be held slightly above it by suitable standoffs, not shown.

With either embodiment, from time to time, the removing agent must to be replaced to maintain water quality at acceptable levels. Providing the agent in packs as described with respect to FIG. 4 facilitates replacement.

It is expected that outlet water quality will depend not only on the concentration of copper ions in the condensate, and the nature of the removing agent, but also on the rate of water flow, amount of agent used per pack, and environmental variables such as temperature and humidity.

The tests described below were conducted to evaluate the effectiveness of the invention at removing copper from HVAC unit condensate.

TEST I

Pans constructed from a previous design (a simple trough without baffles), and having overall dimensions of 96" long by 8" wide by 6" deep, were hung from flanges at the bottom of four air conditioning units atop a metal building roof in Plano, Tex. Each unit's condensate drain line was run to a spot above its pan, at the end opposite the drain hole. Charcoal briquets were placed in the pan and distributed to an even depth of approximately four inches. A screen was fitted above the charcoal to prevent it from reaching the outlet hole.

A sample of the condensate (at the inlet end) was analyzed for copper content, which was found to be 57 micrograms/liter. The rate of condensate production was sufficient to cause the water to rise in the pan, demonstrating that the rate of evaporation would be inadequate to prevent eventual outflow from the pan. Condensate leaving the hole was measured for copper content, which was now 15.6 micrograms/liter. Similar results were observed at each of the four units.

This field test provided data sufficient to show that some of the copper content of the condensate can be removed if channeled through charcoal, even though the pan itself may have contributed to some of the absorption.

TEST II

To determine what portion of the copper ions were absorbed by the pan itself, a test was run utilizing only the stainless steel pan, without any particulate filtering agent. For ease of handling, the pan was fabricated as a simple trough 24" long by 6" high by 8" deep, with no baffles, and with a hole in one end (as in FIG. 1) in lieu of a more elaborate drain outlet (FIG. 4).

Samples were analyzed by atomic absorption with results reported as the average of triplicate readings. Calibration was against standard solutions of 10, 20 and 40 ppb copper in water. Data scatter was about 1–2 ppb on replicates.

The copper content of the feed water held constant at 66 ppb. As the pan filled, the copper ion content at the entrance mixing area averaged 34 ppb while the concentration at the end of the pan average 19 ppb.

After the pan began overflowing through the drain hole, the copper content in the effluent rose to average about 55 ppb. Little, if any, reduction was noted at the exit end of the pan.

As the pan is filling, with good contact with the stainless steel surfaces, some copper is removed. However, without significant baffling or other mixing effects, this removal is not complete or even sufficient when long term operation with overflow is taking place. It appears that in the overflow condition, the water flows largely through the center of the pan from entrance to exit without much mixing with the copper-denuded water near the pan surfaces.

TEST III

A test was performed to test the effectiveness of activated carbon and mossy zinc in removing copper ions from water. A mass of activated carbon was placed in one beaker, and a like mass of mossy zinc was placed in another beaker. Feed water, having an initial copper concentration of 58 ppb, was poured into each beaker at an approximate ratio of water to absorbents of 1:1. Samples of the water were withdrawn from each beaker at intervals up to 2 hours.

After seven minutes with no mixing, but with intimate contact, the copper content was down to about 2 ppb for the zinc-treated water. The copper content of the charcoal-treated water was about 5 ppb. After 30 minutes, the concentration was down to about 1 ppb in both cases. After two hours, concentration was below the calibration range, but appeared to be less than ½ ppb in each case.

Since the invention is subject to modifications and variations, it is intended that the foregoing description and the accompanying drawings shall be interpreted as only illustrative of the invention defined by the following claims.

We claim:

1. An apparatus for removing copper ions from condensate water produced by a heating, ventilating and air conditioning unit, said apparatus comprising an elongate pan having an open top so that condensate can evaporate from the pan, means for introducing condensate water into the pan at a first end of the pan, a drain outlet in the pan at a second end of the pan, a mass of copper removing agent within the pan, between said first and second ends, and baffle means for routing condensate through said mass en route to said outlet, wherein said baffle means comprises two pairs of vertical baffles extending between opposed sides of the pan, each said pair comprising a raised baffle permitting only underflow and a lower baffle permitting only overflow, means for confining a mass of said agent between the raised and lower baffle of each pair, and wherein one mass of agent consists essentially of charcoal and the other mass of agent consists essentially of mossy zinc.

2. The apparatus of claim 1, wherein the confining means comprises a screen envelope surrounding said mass, to keep the removing agents from flowing to said outlet.

3. The apparatus of claim 1, wherein the pan is made of stainless steel having an ability to adsorb copper ions.

4. A method of removing copper ions from condensate water produced by a heating, ventilating and air conditioning unit, said method comprising steps of collecting the condensate water and introducing it into one end of an elongate open-topped pan comprising means for confining a copper removing agent, a quantity of copper removing agent within the confining means, said agent removing copper ions from the condensate water flowing therethrough, and causing the condensate to flow through the agent en route to an overflow drain.

* * * * *